Dec. 17, 1957  L. P. FRIEDER ET AL  2,816,578
BALLISTIC CLOTH
Filed June 17, 1953
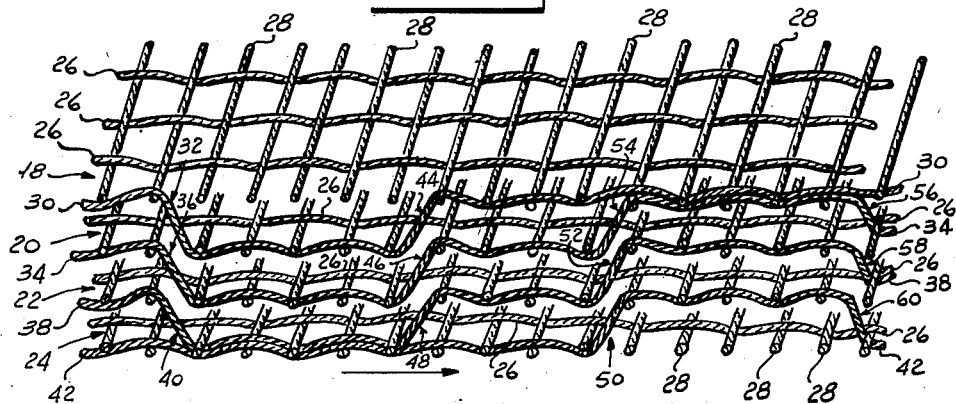
Fig 1
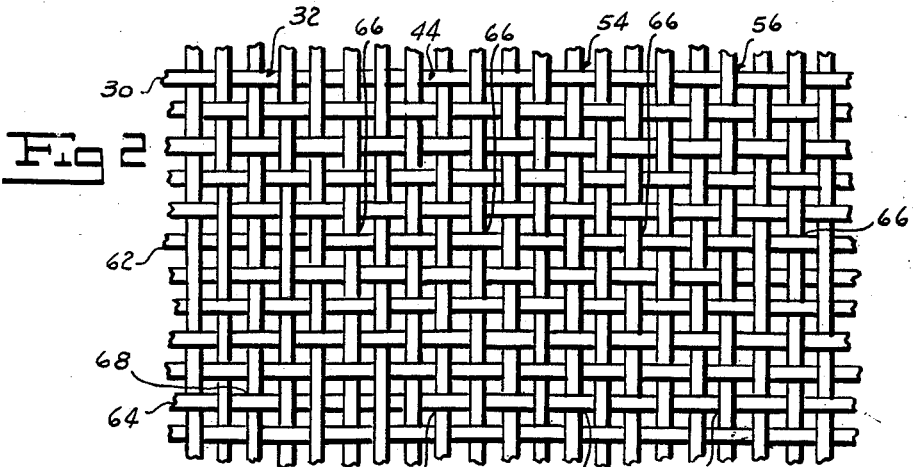
Fig 2
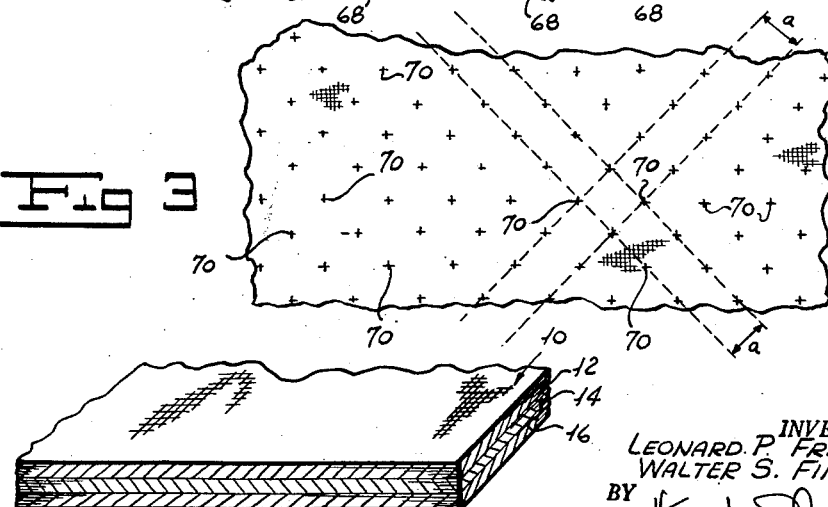
Fig 3
Fig 4
INVENTOR.
LEONARD P. FRIEDER
WALTER S. FINKEN
BY
ATTORNEY United States Patent Office 2,816,578
Patented Dec. 17, 1957

2,816,578

BALLISTIC CLOTH

Leonard P. Frieder, Great Neck, and Walter S. Finken, Brooklyn, N. Y.; said Finken assignor to said Frieder Application June 17, 1953, Serial No. 362,338

16 Claims. (Cl. 139—409)

Our invention relates to ballistic cloth and more particularly to an improved ballistic cloth having a high degree of resistance to penetration by projectiles and the like.

Body armor which materially reduces wounds from flying fragments and missiles has become part of the standard equipment of the modern foot soldier. Armor of this character necessitates a material which is highly resistant to penetration in a localized area and yet which is light in weight and which is not bulky. In olden times armor to protect the person was formed from metal plates or links. This armor, however, is unsatisfactory for modern needs since metal is heavy, rigid, bulky and uncomfortable. It is a good conductor of heat, and therefore, affords no comfort to the wearer in extreme weather conditions. In addition, it is not easily formed to shapes in which it would be suitable for body armor.

Then, too, it has been suggested that a laminated plastic assembly be used to form ballistic cloth. In such an assembly some means must be provided to bond the laminates one to the other. It is a recognized fact, however, that a solid assembly of continuously bonded laminates is not substantially more resistant to penetration than is a solid piece of material. We have discovered that an assembly of laminates bonded to each other and yet which are free to move relative to one another affords a high degree of resistance to penetration. This characteristic can be explained by the fact that the relatively free laminates may deflect differentially with respect to each other and thereby absorb the force of impact of a fragment or missile. An assembly of laminates may deflect differentially with respect to each other and thereby absorb the force of impact of a fragment or missile. However, an assembly of laminates which are bonded together over their entire surface does not permit the laminates to deflect with respect to one another and thereby does not have a substantially greater degree of resistance to penetration than does a solid piece of material.

We have invented an improved ballistic cloth which resists penetration by flying fragments, projectiles or similar missiles. Our ballistic cloth may be used wherever protection from flying fragments or missiles is necessary. For example, body armor or helmets may be formed from the cloth. It may also be used on aircraft to protect the pilot or it may be formed into mats for use to protect any exposed area.

Our improved ballistic cloth includes a number of layers of laminated fabric. The laminates of each layer of laminated fabric are bonded together at discrete intervals so that the bonds may break and permit differential deflection of successive laminations upon impact of a flying fragment, bullet or similar missile.

Then too, we have discovered that we can provide a cloth having superior ballistic properties by reducing the residual percentage of the ultimate elongation of the filaments making up the thread of which the fabric yarn is formed to within critical limits.

We have found further that the ballistic properties of our fabric laminates are governed to a large extent by the residual elongation of the filaments making up the threads forming the fabric yarn, and this can readily be determined by the degree of spinning of the threads making up the yarn employed in weaving the laminates. When the missile to be encountered and resisted by the fabric is a spinning projectile having a sharp nose, such as one shot from a rifle, it depends for its penetrating ability on the concentration of the force of impact in a highly restricted area. A yarn formed of highly spun threads has a higher density than one formed of less highly spun threads and therefore produces a denser fabric which presents a greater concentration of material to resist penetration by a spinning projectile. Therefore, in order that a fabric be resistant to penetration by spinning projectiles having sharp noses, it is desirable that it be formed of a yarn made up of highly spun threads. Though any type may be used, preferably we employ a yarn formed of highly spun, continuous-filament threads formed of nylon, glass, metal or the like, with a predetermined number of twists per unit length which determine the residual elongation of the filaments, as will be pointed out more fully hereinafter.

On the other hand, ballistic fabric made from yarns formed of highly spun threads is not as efficient for resisting penetration by flying fragments or missiles which do not depend upon a highly localized action to penetrate the fabric. Such missiles would, for example, be large fragments of shrapnel or other bursting projectiles. When such flying fragment or missile impinges on the surface of a ballistic cloth, it exerts tensional forces on the yarns making up the cloth. Since spinning a thread above a certain degree to produce a highly spun yarn reduces the residual elasticity of the yarn, fabrics made from yarns formed of highly spun threads appear to be somewhat less efficient in resisting penetration by a large missile or flying fragment of the shrapnel type than fabric formed from yarns made up of relatively less highly spun threads. Consequently, to provide ballistic resistance to shrapnel and the like, the fabric may advantageously be made from yarns formed of less highly spun threads. Preferably, for this use we employ a yarn formed of less highly spun, synthetic, continuous-filament threads of nylon or the like.

It will, therefore, be apparent that the spin requirements for a fabric resistant to penetration by spinning missiles and for a fabric resistant to shrapnel or flying fragments vary to some extent. Since it is desirable that a ballistic cloth be resistant to penetration by both types of missile, we may form some layers of laminated fabric of our ballistic cloth from yarn made up of highly spun threads and other layers of laminated fabric with yarn formed of relatively less highly spun threads. The ballistic properties of the fabric may be enhanced further by metallizing the surface thereof.

One object of our invention is to provide an improved ballistic cloth which has a high degree of resistance to penetration by a missile or flying fragment.

Another object of our invention is to provide an improved ballistic cloth including layers of laminated fabric, the laminates of which are bonded to one another at discrete intervals.

A further object of our invention is to provide an improved ballistic cloth including a number of layers of laminated fabric and layers of relatively soft material interposed between the layers of laminated fabric.

A still further object of our invention is to provide an improved ballistic cloth including layers of laminated fabric, the laminates of some of which layers are formed for the most part from a yarn made of highly spun, synthetic, continuous-filament threads having a predetermined number of twists per unit length and the laminates of the other of which layers are formed for the most part from yarn made up of relatively less highly spun, synthetic, continuous-filament threads having a less number of twists per unit length than the highly spun threads.

Still another object of our invention is to provide an improved ballistic cloth including layers of laminated fabric, selected surfaces of the fabric being coated with metal.

Other and further objects of our invention will appear from the following description.

In general, our invention contemplates the provision of a ballistic cloth including a number of layers of laminated fabric. Each laminate of the laminated fabric layers is woven for the most part from yarn made up of synthetic, continuous-filament threads and adjacent laminates of a particular layer are bonded together at predetermined spaced intervals by selected yarns passing from one to the other of the adjacent laminates.

The laminates of the layers which are to provide resistance to penetration by spinning missiles are formed for the most part of yarn made up of highly spun threads having a predetermined number of twists per unit length, while the laminates of the layers providing resistance to penetration by shrapnel or flying fragments are formed of yarns made up of less highly spun threads having a less number of twists per unit length than the relatively highly spun threads. It is to be understood that in either case the yarns selected for bonding between adjacent laminates may, if desired, have a relatively low tensile strength as compared with the normal yarns of the laminates so that they will rupture as the laminations tend to slide relative to one another when a missile or flying fragment impinges on the cloth surface. This may conveniently be accomplished by varying the number of threads in the weaving end employed for bonding. Between successive layers of laminated fabric we may interpose a layer of relatively soft fabirc which is loosely woven from a large-diameter, soft-twist yarn. In other applications it may be desirable that the bonding yarns be of the same or greater strength than the normal yarns of the laminates.

In the accompanying drawings which form part of the instant specification and which are to be read in conjunction therewith and in which like reference numerals are used to indicate like parts in the various views:

Figure 1 is an expanded perspective view of a fragment of a laminated layer of our improved ballistic cloth on a greatly enlarged scale.

Figure 2 is a top plan view of a fragment of our improved ballistic cloth on a greatly enlarged scale.

Figure 3 is a top plan view of a fragment of our improved ballistic cloth.

Figure 4 is a perspective view of a fragment of our improved ballistic cloth.

Referring now more particularly to the drawings, our improved ballistic cloth, indicated generally by the reference character 10, includes, as can be seen by reference to Figure 4, a top layer 12 which is a layer of laminated fabric, an intermediate layer 14 which may be a layer of relatively soft fabric and a bottom layer 16 which is also a layer of laminated fabric. The intermediate layer 14 may be, for example, a soft fabric which is loosely woven from a large-diameter, soft-twist yarn, that is, a yarn having a low degree of twist. It is to be understood that the cloth shown in Figure 4 is by way of example only. In practice we may build up our cloth from any selected number of layers of laminated fabric and may or may not, as we choose, insert layers of soft material between successive layers of laminated fabric. It will also be appreciated that we may substitute any desired type of soft material for the soft fabric 14 intermediate the layers of laminated fabric. The layers of soft material between successive layers of laminated fabric may be bonded or held in place by any suitable means.

If the layer of the ballistic cloth including laminates 18 to 24 is one which is to be resistant to spinning missiles having sharp noses, we form each of the laminates 18 to 24, with the exception of certain selected yarns, from a yarn made up of highly spun, continuous-filament threads having a predetermined number of twists per unit length. We have discovered that if the filaments making up a thread are less highly spun, a spinning missile engages and cuts only a relatively small number of independent filaments. It will be appreciated that spinning projectiles generally are formed with sharp noses so that they exert a very highly localized penetrating force. When the filaments making up a thread are highly spun, a fabric formed from the resulting yarn is relatively dense and presents a hard surface so that its penetration resistance to spinning missiles is substantially improved.

If the layer including laminates 18 to 24 is to be resistant to flying fragments of the shrapnel type, a highly spun yarn is not best adapted to accomplish the desired result. This type missile is generally flat or shaped so that it exerts its penetrating force over a relatively larger area than does a spinning missile. When such a missile impinges on the surface of a ballistic fabric, it creates tensile strains in the yarns making up the fabric. If the threads forming the yarn are twisted to the required extent for resistance to spinning missiles, their residual elongation is decreased and a fabric formed therefrom does not resist penetration by shrapnel to the same extent as fabric formed from yarns made up of less highly spun threads. The layers of laminated fabric which are designed to resist penetration by shrapnel are formed from yarn made up of less highly spun, continuous-filament threads having a less number of twists per unit length than the threads making up the yarn of the fabric for resisting spinning missiles. Our ballistic cloth may be formed of yarns made from highly spun threads or relatively less highly spun threads, or both, depending on the desired service.

It will be appreciated that in each of the above cases the number of twists per unit length is critical and that some method must be provided for determining the proper number of twists per unit length for threads to form fabric resistant to sharpnosed projectiles and for thread which forms a fabric resistant to missiles of the shrapnel type. To determine the number of twists per unit length, we first take a sample length of the filamentary material from which the threads are to be formed and determine its ultimate elongation. This may conveniently be accomplished by placing the filament under controlled tension and measuring the ultimate elongation to the point at which it parts. It will be understood that the ultimate elongation of commercial filamentary material made up to the same specifications will vary within limits from bobbin to bobbin and hence must be determined for each bobbin.

Since the number of twists per unit of length measures the residual percentage of the ultimate elongation which is critical, this number must be determined for each bobbin of any particular type material. Next, a filament of the material to be employed is placed under a controlled tension and the tension per unit of cross-sectional area required to produce an elongation which is 50 percent of the ultimate elongation is measured. This step is repeated to determine the tension per unit area required to produce an elongation which is 90 percent of the ultimate elongation of a filament.

Each of the threads making up the yarn is to be formed of a selected number of filaments, which may be any desired number, for example, 34. These filaments are spun together on a suitable torsional apparatus having means thereon for measuring the amount of tension applied to the bundle of filaments being spun and the number of turns applied. Conveniently, the bundle of filaments may be arranged between a pair of fixed posts and torsion applied through a motor driven spindle equipped with a reducing gear train and a revolution counter. The filaments are spun together until the tension per unit area theretofore determined to produce 50 percent of the ultimate elongation of a filament is reached. Assuming the diameter of each of the filaments of the bundle making up the thread is the same as that of the filament which was elongated to 50 percent of its ultimate elongation, this tension would be thirty-four times the tension for 50 percent of the ultimate elongation of a single filament. When this tension has been reached, we count and record the number of turns or twists per unit length. If the anchor posts are spaced a predetermined number of units of length apart, the number of turns can be determined by dividing the revolution counter reading by this distance. This step is repeated to determine the number of turns or twists per unit length required to produce a tension per unit area equal to the tension required to produce an elongation of a single filament which is 90 percent of its ultimate elongation.

When the number of turns or twists per unit length to produce tension corresponding, respectively, to an elongation which is 50 percent and 90 percent of the ultimate elongation of a filament has been determined, the threads may be spun to within these limits as desired. For example, to provide a fabric resistant to penetration by spinning projectiles having sharp noses, we would employ a yarn formed from threads spun to a number of twists per unit length in the neighborhood of the number of turns or twists per unit length corresponding to the tension per unit area required to produce an elongation which is 90 percent of the ultimate elongation of a single filament. If we wish to produce a fabric resistant to missiles of the shrapnel type, we employ a yarn formed from threads spun to a number of turns or twists per unit length in the region of the number of turns or twists per unit length required to produce an elongation which is 50 percent of the ultimate elongation of a single filament. It will be apparent that by including respective layers of laminated fabric woven of yarns made from threads spun to a degree in the neighborhood of each of the above limits, we provide a ballistic cloth resistant to penetration by both sharp-nosed projectiles and missiles of the shrapnel type. When the number of turns employed is in the region of the number corresponding to 90 percent of the ultimate elongation of a filament, the filaments may be elongated beyond the elastic limit but not to the breaking point so that they may receive a permanent set. We have found that when the threads are twisted to a degree where the filaments receive a permanent set, the ballistic properties of the fabric are further enhanced.

The limits of 50 percent and 90 percent of the ultimate elongation of a single filament are critical. It will be appreciated also that where yarns of different weight or character are employed, the number of turns or twists per unit length necessary to accomplish the desired result will, of course, vary in producing a yarn having the filament elongated to within the critical range. If the filaments are not elongated to at least 50 percent of their ultimate elongation, the ballistic properties of the cloth are greatly reduced. If the filaments are elongated to more than 90 percent of their ultimate elongation, the residual elasticity will be reduced and the threads will shear too easily so that the ballistic properties of the cloth are consequently diminished.

The ballistic properties of the fabric may be augmented further by metalizing the fabric, as with a sprayed coating. That is, a selected surface or surfaces of the fabric may be coated with any one of a number of metals such, for example, as steel, molybdenum, copper or brass. The coating may be applied by a metal spray gun or any other suitable method.

Referring now to Figure 1, the layer of laminated fabric illustrated includes a top laminate, a pair of intermediate laminates and a bottom laminate, indicated generally, respectively, by reference characters 18, 20, 22 and 24. The direction of weave is indicated by the arrow in Figure 1. The normal warps 26 of each laminate and the wefts 28 of the laminates are formed from yarn made up of continuous-filament threads. A selected warp 30 of the top laminate 18 is drawn down at a point indicated generally by the reference numeral 32 so that it becomes a warp of the laminate 20 below laminate 18. A warp 34 of laminate 20 is similarly drawn down at a point 36 below point 32 and becomes a warp of laminate 22. A selected warp 38 of laminate 22 is drawn down at 40 to lie adjacent the warp 42 of the bottom laminate 24. These selected warps 30, 34, 38 and 42 of the respective laminates 18, 20, 22 and 24 may be relatively weak or have a low tensile strength as compared with the normal warps 26 and the wefts 28. This may conveniently be accomplished by varying the number of threads in the weaving end of the selected warps. It will be appreciated that the portions of warp at points 32, 36 and 40 form bonds between adjacent laminates which resist to a predetermined extent any tendency of the laminates to shift or move relative to one another when a missile or fragment strikes the surface of the ballistic cloth.

The selected warps 30, 34 and 38 of laminates 18, 20 and 22, respectively, are continued as warps of the laminate below for a predetermined distance and are then drawn back up into the laminates from which they came at points indicated by reference numerals 44, 46 and 48, respectively. This normal weave in each of the laminates is continued for a further predetermined distance. When a selected point has been reached, the selected warp 42 of the bottom laminate 24 is drawn up at a point indicated by reference character 50 into laminate 22 to become a warp thereof. Similarly, warp 38 of laminate 22 and warp 34 of laminate 20 are drawn up at points indicated generally, respectively, by reference characters 52 and 54 to become warps of laminates 20 and 18, respectively. These warps 42, 38 and 34 are continued in the laminates into which they have been drawn for a predetermined distance and then drawn back down into the laminates from which they came so that a normal weave is restored. The bonds at these points are indicated generally by reference characters 56, 58 and 60.

It will be appreciated that while we have described our invention as having bonds formed by selected warps, we could form similar bonds with selected wefts at predetermined intervals. The selected wefts could also vary in strength from the normal yarn of the laminates. We have selected the warps as the bonding medium for convenience, since selected wefts would necessitate the use of a separate shuttle carrying the relatively different strength yarn.

It is to be noted that we have illustrated our fabric in Figures 1 and 2 on a greatly enlarged scale. In order to completely disclose our invention, we have shown in these figures a number of bonds at relatively short intervals. For example, the distance between bonds 32 and 44 is only a distance of five wefts, as illustrated. In actual practice, however, there will be a great number of wefts between these bonds. Our fabric is tightly woven, and our bonds are spaced in the fabric along an oblique line making an angle of about 45 degrees with the direction of the weave, approximately one quarter of an inch apart. In addition to the selected warps illustrated in Figure 1, we select other warps such as warps 62 and 64 in top laminate 18 and the corresponding warps in the laminates therebelow and provide bonds therealong indicated, respectively, by reference numerals 66 and 68, as shown in Figure 2. It will be appreciated that while the selected warps 30 and 62 and 64 are separated by only four normal warps 28 as shown in Figure 2, in practice there is a much greater number of warps between successive selected warps, so that the spacing between bonds along lines making an angle of 45 degrees with the direction of weave is approximately one quarter of an inch.

A fragment of our ballistic cloth is illustrated in Figure 3. The bonds are disposed in the layer of laminated fabric in the manner illustrated and indicated by reference numeral 70. A bond formed by a particular warp is separated from the closest bonds formed by an adjacent selected warp by a distance $a$. This distance $a$ is approximately one quarter of an inch on the surface of the laminated fabric. It is to be understood that we are not restricted to the number of laminates illustrated in Figure 1. In practice we may employ any desired number of laminates and bind them one to the other in the manner illustrated. We may, if we desire, make our ballistic cloth resistant to penetration by both spinning missiles and shrapnel or flying fragments by forming selected layers of laminated fabric from yarn made up of highly spun threads and other layers of yarn made of relatively less highly spun threads, as explained. In addition, as mentioned hereinbefore, we may bind by wefts rather than warps or by any combination of wefts and warps. The spacing between and the relative disposition of bonds is a matter of choice, and we have selected the arrangement shown as being the most practicable.

In use, when a flying fragment or missile strikes the surface of our improved ballistic cloth, it exerts a localized penetrating force on the cloth. This force flexes the cloth and in so doing differentially deflects the laminates of the laminated fabric layer. Before the laminates may differentially deflect or move relative to one another, the bonds 70 between adjacent layers must be broken. Advantageously, we select relatively weak yarns to form the bonds. We may do this so that the bonds will rupture more readily to permit differential deflection before the normal yarns of the fabric are torn or broken by the fragment. This differential deflection of successive laminates absorbs the force of impact of the missile and prevents or reduces injury to the wearer. The layer 14 of soft fabric provides a seat for the laminated fabric when it flexes and assists in absorbing the force of impact of the missile. Our improved ballistic cloth tends to deflect the line of flight of the missile by virtue of the deflection of the laminated fabric and also to absorb the force of impact. If the missible striking the ballistic cloth is a spinning projectile having a sharp nose, it may pass through the laminates of a layer of laminated fabric formed of yarns made up of relatively less highly spun threads, since it engages and breaks a smaller number of threads. Its passage through the cloth, however, will be arrested by the layers of laminated fabric formed of yarns made up of highly spun threads having a predetermined number of twists per unit length since the thread number density is greater. If, on the other hand, the missile is of the shrapnel type, it may shear a layer of laminated fabric formed of yarns made up of highly spun threads, but its penetration of the cloth will be prevented by the layers of laminated fabric formed of yarns made up of relatively less highly spun threads with a smaller number of twists per unit length. The object is to bond adjacent laminates to each other by rupturable yarns. These yarns or weaving ends may be relatively weaker than the normal yarns of the fabric, but if desired, may be identical with or stronger than the normal yarns. The relative strength of the selected yarns may conveniently be controlled by varying the number of threads in the selected yarn or weaving end relative to the number of threads making up a normal yarn. It will be appreciated that the selection of relatively weak bonding yarns is of greater advantage where the layer is one which is to resist penetration by sharpnel. In the showing of Figure 4, the top layer of laminated fabric 12 could, for example, be a layer resistant to spinning projectiles having sharp noses and the bottom layer 16 could be a layer resistant to missiles of the shrapnel type. In practice, of course, any number of layers of laminated fabric of both types are used, depending on the ballistic strength required. Intermediate layers 14 of soft material may or may not be provided, as required.

While we have described our ballistic cloth as being formed preferably of a continuous-filament, synthetic yarn, other materials could advantageously be substituted. For example, if it is desirable to improve the fire-resistant properties of our cloth, the cloth may be formed with layers of laminated woven glass fabric. The glass fabric laminates would be bonded together by selected warps or wefts in the same manner as that disclosed in connection with the continuous-filament synthetic yarn.

It is also to be noted that while we have shown a selected yarn as being drawn up or down from one laminate to form a warp of an adjacent laminate for a short distance in the direction of weave, many variations are possible without departing from the spirit of our invention. For example, selected warps or wefts may be drawn down progressively into each of the laminates and then progressively drawn upwardly to the laminates from which they came. Then too, selected warps or wefts may be drawn down into the laminations therebelow in a direction at an angle to the direction of weave. The end result would not, of course, be changed by either of these operations. That is, a laminated fabric results which is provided with a number of bonds between adjacent laminates at discrete points, the lines of bonds being in staggered relationship to one another.

Thus it will be seen that we have accomplished the objects of our invention. We have provided an improved ballistic cloth which is highly resistant to penetration by spinning missiles or by flying fragments or missiles of the shrapnel type. Our improved cloth includes layers of laminated fabric, the laminates of which are bonded together at spaced intervals by selected yarns of the laminate itself to permit differential deflection under a highly localized impact. In addition, we have disposed layers of relatively soft material between the layers of laminated fabric to provide a seat for the laminated fabric when deflected an assist in absorbing the force of impact of a missile impinging on the surface of the ballistic cloth. Selected surfaces of the fabric may be coated with metal to improve the ballistic properties of the cloth.

It is to be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A ballistic cloth comprising a layer of laminated fabric including a plurality of fabric laminates, selected yarns of each of said laminates passing into an adjacent laminate at predetermined points so as to form a part of the laminate into which said yarns pass, each of said selected yarns being interwoven with a plurality of successive yarns of a laminate into which it is drawn, each of said selected yarns passing directly from a laminate yarn with which it is interwoven in one laminate to a laminate yarn with which it is interwoven in a laminate into which the selected yarn is drawn.

2. A ballistic cloth as in claim 1 wherein said fabric laminates are woven fabrics and said selected yarns are warp yarns.

3. A ballistic cloth as in claim 1 wherein said fabric laminates are woven fabrics and said selected yarns are weft yarns.

4. A ballistic cloth as in claim 1 wherein said fabric is a woven fabric and said selected yarns include both weft and warp yarns.

5. A ballistic cloth as in claim 1 wherein said selected yarns pass back into the laminates from which they came at points removed from said predetermined points at selected intervals.

6. A ballistic cloth as in claim 1 wherein a surface of said layer of laminated fabric is coated with metal.

7. A ballistic cloth comprising a plurality of layers of laminated fabric, each of said layers including a number of fabric laminates, selected yarns of each of the laminates of a layer passing into an adjacent laminate of the same layer at predetermined points so as to form a part of the laminate into which said yarns pass, each of said selected yarns being interwoven with a plurality of successive yarns of a laminate into which it is drawn, each of said selected yarns passing directly from a laminate yarn with which it is interwoven in one laminate to a laminate yarn with which it is interwoven in a laminate into which the selected yarn is drawn.

8. In a ballistic cloth a layer of laminated fabric including a plurality of fabric laminates made up of yarn formed from threads having a predetermined number of twists per unit length, each of said threads including a bundle of filaments, the number of twists being determined by the tension per unit of cross-sectional area required to produce an elongation of the filaments which is between the limits of 50 percent and 90 percent of the ultimate elongation of the filaments.

9. In a ballistic cloth a plurality of layers of laminated fabric, the laminates of each of said layers being formed from yarn made up of threads each including a bundle of filaments, the threads of selected ones of said layers having a first predetermined number of twists per unit length and the threads of other of said layers having a second number of predetermined twists per unit length, said first and second predetermined numbers being determined by the tensions per unit of cross-sectional area required to produce elongations of an individual filament which are respectively in the region of 50 percent and in the region of 90 percent of the ultimate elongation of the filament.

10. A method of making a ballistic cloth including the steps of determining the ultimate elongation of a length of the filamentary material to be employed in making the cloth, measuring the tension per unit of cross-sectional area required to produce an elongation of said length which is a predetermined percentage of said ultimate elongation, spinning a bundle of filaments of said material together under tension until said pretermined tension per unit of cross-sectional area is reached to form a thread, forming a yarn from a number of said threads and weaving the ballistic cloth from said yarn.

11. In a ballistic cloth a layer of laminated fabric including a plurality of fabric laminates made up of yarn formed from threads having a predetermined number of twists per unit length, each of said threads including a bundle of filaments, the number of twists being determined by the tension per unit of cross-sectional area required to produce an elongation of the filaments which is between 50 percent and 90 percent of the ultimate elongation of the filaments.

12. A laminated ballistic fabric including in combination a first fabric laminate, a second fabric laminate and a third fabric laminate, each of said laminates including warp and weft yarns, selected warp yarns of said first laminate being drawn into said second laminate to form a part thereof, selected warp yarns of said second laminate being drawn into said third laminate to form a part thereof, each of said selected warp yarns being interwoven with a plurality of successive weft yarns of a laminate into which it is drawn, each of said selected yarns passing directly from a laminate yarn with which it is interwoven in one laminate to a laminate yarn with which it is interwoven in a laminate into which the selected yarn is drawn.

13. A laminated ballistic fabric as in claim 12 in which selected warp yarns of said third laminate are drawn up into said second laminate.

14. A ballistic cloth comprising a layer of laminated fabric including a plurality of fabric laminates, selected yarns of each of said laminates passing into an adjacent laminate at predetermined points so as to form a part of the laminate into which said yarns pass, said fabric laminates including normal warp yarns of a given tensile strength, said selected yarns being of lower tensile strength than said given tensile strength.

15. A ballistic cloth comprising a plurality of layers of laminated fabric, each of said layers including a number of fabric laminates, selected yarns of each of the laminates of a layer passing into an adjacent laminate of the same layer at predetermined points so as to form a part of the laminate into which said yarns pass, certain of said layers being formed from yarn made up of synthetic continuous filament threads having a number of twists per unit length corresponding to an elongation of a thread filament in the region of 90 percent of the ultimate elongation of the filament and the remainder of said layers being formed from yarn made up of synthetic continuous filament threads having a number of convolutions per unit length corresponding to the elongation of a thread filament in the region of 50 percent of the ultimate elongation of the filament.

16. A ballistic cloth comprising a layer of laminated fabric including a plurality of fabric laminates, selected yarns of each of said laminates passing into an adjacent laminate at predetermined points so as to form a part of the laminate into which said yarns pass, each of said selected yarns being interwoven with a plurality of successive yarns of a laminate into which it is drawn, a second layer of laminated fabric, said laminated fabric layers having a given hardness and a layer of material relatively soft with respect to said laminated fabric layers interposed between said layers of laminated fabric.

References Cited in the file of this patent

UNITED STATES PATENTS

| | | |
|---|---|---|
| 653,887 | Robertson | July 17, 1900 |
| 710,775 | Hardwick | Oct. 7, 1902 |
| 1,273,815 | Bicknell | July 30, 1918 |
| 1,756,151 | Gardiner | Apr. 29, 1930 |
| 2,630,620 | Rand | Mar. 10, 1953 |
| 2,664,922 | Walters et al. | Jan. 5, 1954 |

FOREIGN PATENTS

| | | |
|---|---|---|
| 27,154 | Great Britain | of 1906 |